United States Patent
Singh et al.

(10) Patent No.: US 9,055,504 B1
(45) Date of Patent: Jun. 9, 2015

(54) METHODS AND SYSTEMS FOR USING BASE STATIONS TO CONTROL RATE AT WHICH USER EQUIPMENT DEVICES PROVIDE MEASUREMENT REPORTS TO BASE STATIONS

(71) Applicant: Sprint Spectrum L.P., Overland Park, KS (US)

(72) Inventors: Jasinder P. Singh, Olathe, KS (US); Deveshkumar N. Rai, Overland Park, KS (US); Maulik K. Shah, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 244 days.

(21) Appl. No.: 13/682,734

(22) Filed: Nov. 21, 2012

(51) Int. Cl.
| | |
|---|---|
| *H04W 52/34* | (2009.01) |
| *H04W 36/30* | (2009.01) |
| *H04W 48/16* | (2009.01) |

(52) U.S. Cl.
CPC .............. *H04W 36/30* (2013.01); *H04W 48/16* (2013.01); *H04W 52/343* (2013.01)

(58) Field of Classification Search
CPC ..... H04W 36/30; H04W 48/16; H04W 36/26; H04W 16/08; H04W 52/0206; H04W 52/343; H04W 72/0473; Y02B 60/50
See application file for complete search history.

(56) References Cited

U.S. PATENT DOCUMENTS

| | | | |
|---|---|---|---|
| 7,466,682 B1 | 12/2008 | Ribas et al. | |
| 7,499,700 B2 | 3/2009 | Dillon et al. | |
| 7,580,362 B2 | 8/2009 | Timus | |
| 2004/0022213 A1* | 2/2004 | Choi et al. | 370/332 |
| 2005/0101328 A1* | 5/2005 | Son et al. | 455/436 |
| 2005/0107110 A1 | 5/2005 | Vasudevan et al. | |
| 2006/0135173 A1 | 6/2006 | Vannithamby | |
| 2007/0168326 A1* | 7/2007 | Das et al. | 707/2 |
| 2008/0182609 A1* | 7/2008 | Somasundaram et al. | 455/522 |
| 2009/0275334 A1* | 11/2009 | Xie et al. | 455/436 |
| 2010/0093287 A1* | 4/2010 | Higuchi et al. | 455/67.13 |
| 2010/0172329 A1 | 7/2010 | Yokoyama et al. | |
| 2010/0255859 A1 | 10/2010 | Park et al. | |

(Continued)

FOREIGN PATENT DOCUMENTS

WO  2013/037842 A1  3/2013

OTHER PUBLICATIONS

Tripathi, Suyash et al., LTE E-UTRAN and its Access Side Protocols; Radisys, pp. 1-17, Sep. 2011.

(Continued)

*Primary Examiner* — Quan M Hua (57) ABSTRACT

A serving base station (SBS) that provides service to a UE device can receive or determine admission capacity of a neighbor base station (NBS). The SBS can determine a reporting interval based on the admission capacity and provide the UE device with the reporting interval. Upon determining that handover from the SBS to the NBS may be necessary, the UE device can responsively start transmitting measurement data regarding the NBS to the SBS. Transmission of the measurement data can occur at intervals that equal the reporting interval. The value of the reporting interval can be conditioned on the admission capacity of the NBS. As the capacity for admitting more UE devices decreases, the likelihood of the UE device handing over to the NBS may decrease. Increasing the reporting interval for reporting measurement data regarding the NBS can reduce loading of the reverse-links to the SBS.

24 Claims, 5 Drawing Sheets

(56) References Cited

U.S. PATENT DOCUMENTS

2010/0279715 A1    11/2010   Alanara et al.
2011/0021197 A1    1/2011   Ngai
2011/0305137 A1    12/2011   Chu et al.

OTHER PUBLICATIONS

Sharetechnote, Handover, pp. 1-15, downloaded from the World Wide Web at http://www.sharetechnote.com/html/Handover_LTE.html on Oct. 29, 2012.

Steepest Ascent Ltd, Control Signaling—Downlink Control Channel, pp. 1-13, downloaded from the World Wide Web at http://www.steepestascent.com/content/mediaassets/htm/LTE/Help/PDCCH.html on Oct. 29, 2012.

Measurement reports UMTS and LTE, pp. 1-4, document date: May 19, 2010, downloaded from World Wide Web at http://wireless3g4g.blogspot.com/2010/05/measurement-report-umts-and-lte.html on Oct. 29, 2012.

LTE Measurements by Ue, pp. 1-3, document date: Feb. 19, 2012, downloaded from World Wide Web at http://ltesimplified.blogsport.com/2012/02/lte-measurements-by-ue.html on Oct. 30, 2012.

ML1 Serving Cell Measurement Resposne, pp. 1-9, document date: Jan. 12, 2012, downloaded from World Wide Web at http://lteguide.blogsport.com/2012/01/ml1-serving-cell-measurement-response.html on Nov. 16, 2012.

Katumba, Brian et al., The LTE Access Procedure, Department of Computer Science and Engineering and Department of Signals and Systems, Chalmers University of Technology, Gothenburg, Sweden, 6 pages, May 13, 2011.

Rao, V. Srinivasa et al., Interoperability in LTE, Webbuyersguide.com, pp. 1-12, Mar. 12, 2010.

Amirijoo, Mehdi et al., Neighbor Cell Relation List and Physical Cell Identity Self-Organization in LTE, Wireless Access Networks, Ericsson Research, Ericsson AB, Sweden, 5 pages, Feb. 28, 2008.

Cell Reselection Procedures in LTE, downloaded from the World Wide Web at https://sites.google.com/site/lteencyclopedia/cell-reselection-procedures-in-lte on Oct. 23, 2012, pp. 1-4.

* cited by examiner

METHODS AND SYSTEMS FOR USING BASE STATIONS TO CONTROL RATE AT WHICH USER EQUIPMENT DEVICES PROVIDE MEASUREMENT REPORTS TO BASE STATIONS

BACKGROUND

Unless otherwise indicated herein, the elements described in this section are not prior art to the claims and are not admitted to be prior art by inclusion in this section.

A wireless user equipment (UE) device, such as a cellular phone, can operate within a first radio frequency (RF) coverage area provided by a base station. The UE device can be configured for handover to a second RF coverage area provided by that same base station or another base station. Handover of the UE device permits a communication session (such as voice call or internet browsing session) occurring via the UE device to continue as the UE device is moved from the first coverage area to the second RF coverage area.

RF signals transmitted from a base station within a coverage area to the wireless UE device can be referred to as forward-link signals. Transmission of the forward-links signals occur over a forward-link. RF signals transmitted from the UE device to the base station can be referred to as reverse-link signals. Transmission of the reverse-link signals occur over a reverse-link.

The UE device can generate measurement reports that a base station can use to determine whether handover of the UE device should occur. The UE device can transmit the measurement reports to the base station serving the UE device until the UE device hands over to another base station or to another coverage area provided by the base station serving the UE device. If the neighbor base station or the other coverage area does not or cannot currently allow handover of the UE device, then transmission of reverse-link signals with the measurement reports can load the reverse-link with the serving base station unnecessarily.

OVERVIEW

This application describes several example embodiments, at least some of which pertain to determining the capacity of a base station to admit additional UE devices to operate within a coverage area provided by the base station. A UE device, being served by a first base station, can be provided with data indicating the admission capacity of a second base station. The UE device can select a reporting interval that indicates how often the UE device should transmit measurement reports regarding the second base station to the first base station. Selection of the reporting interval can be conditioned on the admission capacity of the second base station. As the admission capacity changes, so can the reporting interval used by the UE device.

In one respect, an example embodiment can take the form of a method comprising (i) receiving, at a first base station, first data for determining a first current admission capacity of a second base station, wherein the first base station and the second base station are neighbor base stations to each other, and wherein the first base station is serving a first user equipment (UE) device, (ii) determining, at the first base station based on the first data, the first current admission capacity of the second base station, (iii) selecting, at the first base station based on the first current admission capacity of the second base station, a first reporting interval for the first UE device to use to report, to the first base station, measurement data regarding the second base station, and (iv) transmitting wirelessly, from the first base station, the selected first reporting interval.

In another respect, an example embodiment can take the form of a base station system comprising: (i) a network interface configured to receive first data for determining a first current admission capacity of a second base station, wherein the base station system and the second base station are neighbor base stations to each other, and wherein the base station system is configured to serve a first UE device, (ii) a processor, (iii) a data storage device storing computer-readable program instructions, wherein the program instructions are executable by the processor to select, based on the first current admission capacity of the second base station, a first reporting interval for the first UE device to use to report, to the base station system, measurement data regarding the second base station, and (iv) a wireless network interface configured to transmit, wirelessly, the selected first reporting interval.

In yet another respect, an example embodiment can take the form of a method comprising: (i) receiving, at a UE device from a first base station serving the UE device, a first reporting interval, wherein the UE device uses the first reporting interval to determine how often to report, to the first base station, measurement data regarding a second base station the UE device determines after receiving the first reporting interval but prior to receiving a second reporting interval, (ii) determining, at the UE device after receiving the first reporting interval but prior to receiving the second reporting interval, measurement data regarding the second base station, wherein the measurement data comprises, as determined at the UE device in the following order, first measurement data and second measurement data, and (iii) transmitting, from the UE device to the first base station after receiving the first reporting interval but prior to receiving the second reporting interval, the first measurement data, and, after waiting an amount of time substantially equal to the first reporting interval, transmitting, from the UE device to the first base station, the second measurement data.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

Base stations operating near (for example, adjacent to) a base station serving a UE device can be referred to as neighbor base stations. The base station serving the UE device can be referred to as a serving base station. A serving base station can be a neighbor base station to one or more of its neighbor base stations. Neighbor base stations can be configured to communicate with one another via wired or wireless communication links that connect the neighbor base stations. Base stations neighboring the serving base station can transmit, to the serving base station, data that indicates the admission capacity of the neighbor base station or data the serving base station can use to determine the admission capacity of the neighbor base station. The data useable to determine the admission capacity can comprise data that indicates load information regarding the neighbor base station. The admission capacity of a base station can change as the number of UE devices the base station is serving changes.

The UE device can determine measurement reports regarding a base station neighboring the serving base station. The UE device can transmit the measurement reports to the serving base station. The serving base station can use the measurement reports to determine whether the UE device should be handed over to the neighbor base station. The UE device can determine the admission capacity of the neighbor base station and condition how often measurement reports regarding the neighbor base station are transmitted to the serving base station based on the admission capacity.

In this description, the articles "a" or "an" are used to introduce elements of the example embodiments. The intent of using those articles is that there is one or more of the elements. The intent of using the conjunction "or" within a described list of at least 2 terms is to indicate that any of the listed terms or any combination of the listed terms. The use of ordinal numbers such as "first," "second," "third" and so on is to distinguish respective elements rather than to denote a particular order of those elements.

The diagrams and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions) can be used instead. Furthermore, various functions described as being performed by one or more elements can be carried out by a processor executing computer-readable program instructions or by any combination of hardware, firmware, or software.

II. Example Architecture

Figure 1:
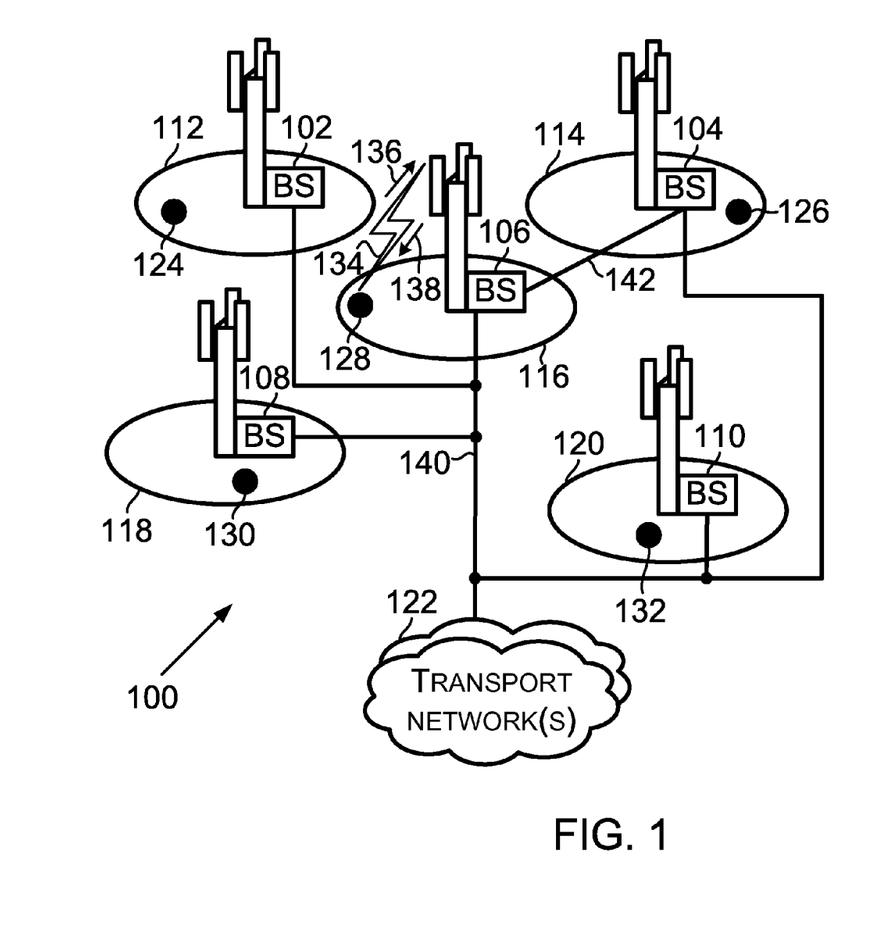
FIG. 1 is a diagram depicting a system in accordance with one or more of the example embodiments.

FIG. 1 is a diagram depicting a system 100 in accordance with one or more of the example embodiments. System 100 can be referred to as a communication network or, more particularly, a wireless communication network. System 100 includes multiple base stations, represented by base stations 102, 104, 106, 108, and 110. System 100 can include a different number of base stations than is shown in FIG. 1. Each base station shown in FIG. 1 can include a transceiver to transmit and receive radio frequency (RF) signals. Each of those base stations can include a transceiver tower, as shown in FIG. 1, but is not so limited.

The RF signals transmitted by each base station provide a coverage area (for example, one or more coverage areas) in which user equipment (UE) devices can operate to carry out wireless communications. In FIG. 1, the coverage areas provided by base stations 102, 104, 106, 108, and 110 are coverage areas 112, 114, 116, 118, and 120, respectively. The RF signals received by each base station can be from UE devices operating within the coverage area provided by that base station.

The RF signals transmitted to a base station from a UE device and the RF signals transmitted from that UE device to that base station can be referred to or make up an air interface. The RF signals transmitted over an air interface can include bearer signals (for example, voice, fax, or video signals) or control signals.

FIG. 1 shows an air interface 134 between base station 106 and UE device 128. The RF signals transmitted from a base station to a UE device (for example, RF signals 138) can be referred to a forward-link signals or forward-link communications. The RF signals transmitted via a UE device to a base station (for example, RF signals 136) can be referred to as reverse-link signals or reverse-link communications.

For simplicity, each coverage area is area is shown as an ellipse, but each coverage area is not so limited, as it can take a shape other than an ellipse. For clarity of FIG. 1, none of the coverage areas of system 100 is shown as overlapping another coverage area. A person skilled in the art will understand that each coverage area can overlap or be overlapped by another coverage area.

Multiple UE devices can operate within system 100 to perform communications using the base stations. For simplicity of FIG. 1, only one UE device 124, 126, 128, 130, and 132 is shown within each coverage area 112, 114, 116, 118, and 120. A person having ordinary skill in the art will understand that multiple UE devices can operate simultaneously within a coverage area.

In one respect, a UE device can be a mobile UE device. A mobile UE device can be moved from a first coverage area to a second coverage area and operate with a base station while moving between those coverage areas. In another respect, a UE device can be a stationary UE device that is configured for operating at a fixed location. The fixed location may be limited to a location at which the stationary UE device can receive electrical power to operate the UE device.

In practice, each base station can communicate with a UE device (that is, one or more UE devices) over an air interface according to one or more air interface protocols, examples of which include LTE, CDMA, WiMAX, IDEN, GSM, GPRS, UTMS, EDGE, MMDS, WIFI, BLUETOOTH, and other protocols now known or later developed. The principles of the example embodiments may be applicable in various ones of these protocols. For the example embodiments using the LTE (long term evolution) protocol, the base stations serving a UE device can be referred to as "eNodeB" or "eNB."

System 100 can include an inter-base-station communication link (such as inter-base station communication link 142) that connects two neighbor base stations together to allow inter-base station communications. In accordance with embodiments in which the LTE air interface protocol is used, communication link 132 can comprise an X2 link. System 100 can include communication links 140 to provide base stations 102, 104, 106, 108, and 110 with connectivity to one or more transport networks 122, such as the public switched telephone network (PSTN) or the Internet for instance. With this arrangement, a UE device that is positioned within the coverage area of a base station and that is suitably equipped may engage in air interface communication with the base station and can thereby communicate with remote entities on the transport network(s) and/or with other UE devices served by a base station of system 100. Communication link 140 can also connect two or more neighbor base stations together to allow inter-base station communications to occur.

Figure 2:
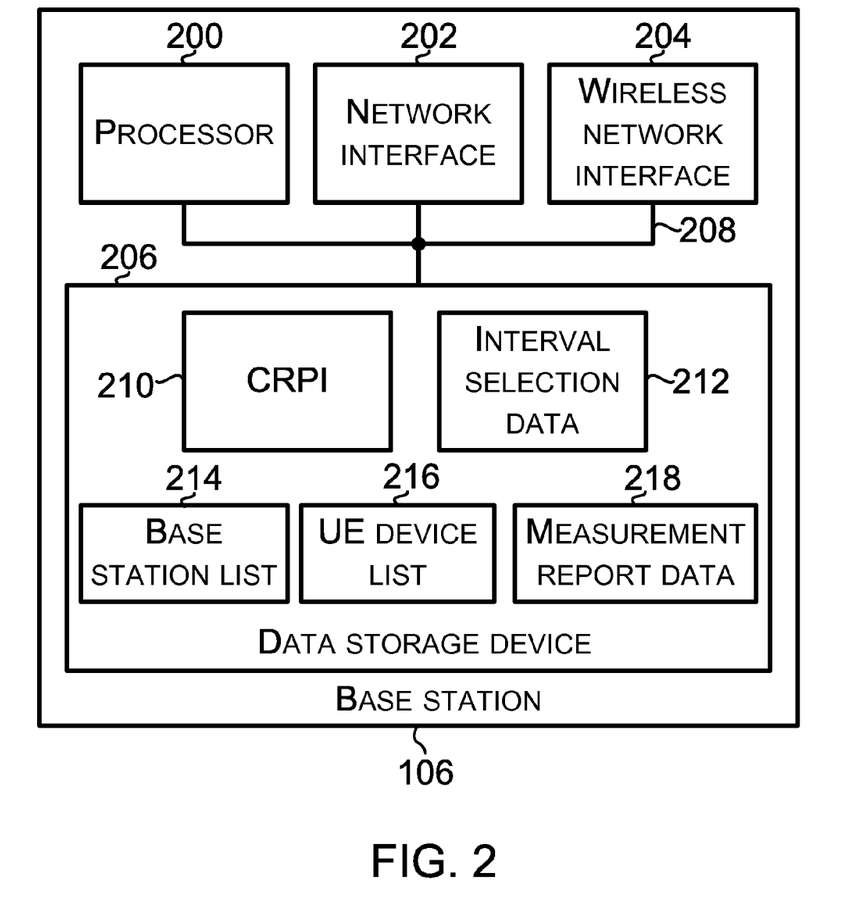
FIG. 2 is a block diagram of a base station system in accordance with one or more of the example embodiments.

Next, FIG. 2 is a block diagram of base station 106 in accordance with one or more of the example embodiments. Base station 106 includes a processor 200, a network interface 202, a wireless network interface 204, and a data storage device 206, all of which can be linked together via a system bus, network, or other connection mechanism 208. One or more other base stations shown in FIG. 1 can be configured as base station 106, as shown in FIG. 2.

Processor 200 can comprise one or more general purpose processors (for example, INTEL single core microprocessors or INTEL multicore microprocessors) or one or more special purpose processors (for example, application specific integrated circuits (ASICs) or digital signal processors (DSPs)). Processor 200 can execute computer-readable program instructions, such as computer-readable program instructions (CRPI) 210.

Network interface 202 can comprise a wired or wireless interface for communicating with a network infrastructure (such as a switch, gateway, mobility manager, or the like), which provides connectivity or facilitates communication with one or more of the transport networks 122.

Wireless network interface 204 can include one or more components for transmitting RF signals (for example, data) to a UE device operating in a coverage area provided by base station 106 and for receiving RF signals (for example, data) from a UE device operating in a coverage area provided by base station 106. Those components can include a transmitter and a receiver, distinct from one another, or a transceiver including both a transmitter and a receiver. As an example, wireless network interface 204 can be arranged as a multiple-input-multiple-output (MIMO) system including multiple transmit antennas (for example, 2 or 4 antennas) and multiple receive antennas (for example, 2 or 4 antennas).

Data storage device 206 can comprise a non-transitory computer-readable storage medium readable by processor 200. The computer-readable storage medium can comprise volatile and/or non-volatile storage components, such as optical, magnetic, organic or other memory or disc storage, which can be integrated in whole or in part with processor 200. Data storage device 206 can also or alternatively be provided separately, as a non-transitory machine readable medium. As shown in FIG. 2, data storage device 206 can store CRPI 210, interval selection data 212, a base station list 214, a UE device list 216, and measurement report data 218.

Base station list 214 can include data (for example, a base station identifier) identifying each base station that operates as or is a neighbor base station to base station 106. Base station list 214 or other data stored in data storage device 206 can identify data associated with each of the neighbor base stations. Table 1 illustrates example data that can be stored in base station list 214. For simplicity, Table 1 shows the base station identifiers as the reference number of each neighbor base station in FIG. 1. Other base station identifiers can be used in base station list 214.

TABLE 1

| Neighbor Base Station Identifier | Base Station Arrangement | Current Admission Capacity |
|---|---|---|
| 102 | 1 | 50% |
| 104 | 2 | 73% |
| 108 | 1 | 28% |
| 110 | 2 | 81% |

The base stations neighboring base station 106 can operate according to a common air interface protocol. Alternatively, two or more of the neighboring base stations can operate according to different air interface protocols. Differences in air interface protocols or some other difference(s) in the neighboring base stations can result in the base stations having different arrangements. Base station list 214 can include data identifying an arrangement of each neighbor base station (see center column of Table 1). Selecting a reporting interval from interval selection data 212 can be conditional upon the arrangement of neighbor base station.

Base station list 214 can also include data identifying a current admission capacity of each neighboring base station. The current admission capacity can provide an indication of how likely the neighbor base station can accept one or more base stations to handover to the neighbor base station. Admission capacities can be specified as a percentage, such as a percentage between 0% and 100%, inclusive. For purposes of this description, 0% admission capacity represents that the base station cannot currently admit any addition UE devices, whereas 100% admission capacity represents that the maximum number of UE devices the base station can handle can currently be admitted by the base station. Percentages in between 0% and 100% represent a portion of the maximum number of UE devices the base station can handle and currently be admitted by the base station. In an alternative arrangement, 0% admission capacity can represent represents that the maximum number of UE devices the base station can handle can currently be admitted by the base station, and 100% admission capacity can represent that the base station cannot currently admit any addition UE devices.

Table 1 illustrates example data that can be stored as part of base station list 214 or within another part of data storage device 206. As shown in Table 1, base stations 102, 104, 108, and 110 are neighbor base stations to base station 106, and base stations 102 and 108 are classified as being base station arrangement 1, and base stations 104 and 110 are classified as being base station arrangement 2. As an example, base station arrangement 1 can be a base station arranged to carry out $4^{th}$ generation (4G) mobile communications using the LTE protocol, and base station arrangement 2 can be a base station arranged to carry out 4G mobile communications using the WiMAX protocol. Other examples of the base station arrangements are also possible.

The current admission capacity for each neighbor base station in Table 1 is shown as a percentage. Additionally or alternatively, that capacity can be identified as decimal, a quantity of mobile stations that can be handed over to the neighbor station, or some other current admission capacity of a neighbor base station. As the current admission capacity of a neighbor base station changes, network interface 202 can receive, from that base station, data indicating a new admission capacity to be stored in base station list 214. Alternatively, network interface 202 can receive, from that base station, data that base station 106 can use to determine the new admission capacity. That data can include, for example, parameters indicating loading of the base station, a number of radio resource control (RRC) users connected to the base station, a physical uplink control channel capacity, a number of data bearers the base station can support, backhaul capacity, or a quantity of voice over LTE (VoLTE) users the base station can handle.

UE device list 216 can include data identifying each UE device currently being served by base station 106. The data to identify each UE device can, for example, include a mobile identification number assigned to the UE device or an electronic serial number assigned to the UE device. Base station 106 can use data in UE device list 216, at least in part, to determine loading of base station 106. Network interface 206 can transmit to the neighbor base stations data that indicates the loading of base station 106.

Figure 4:
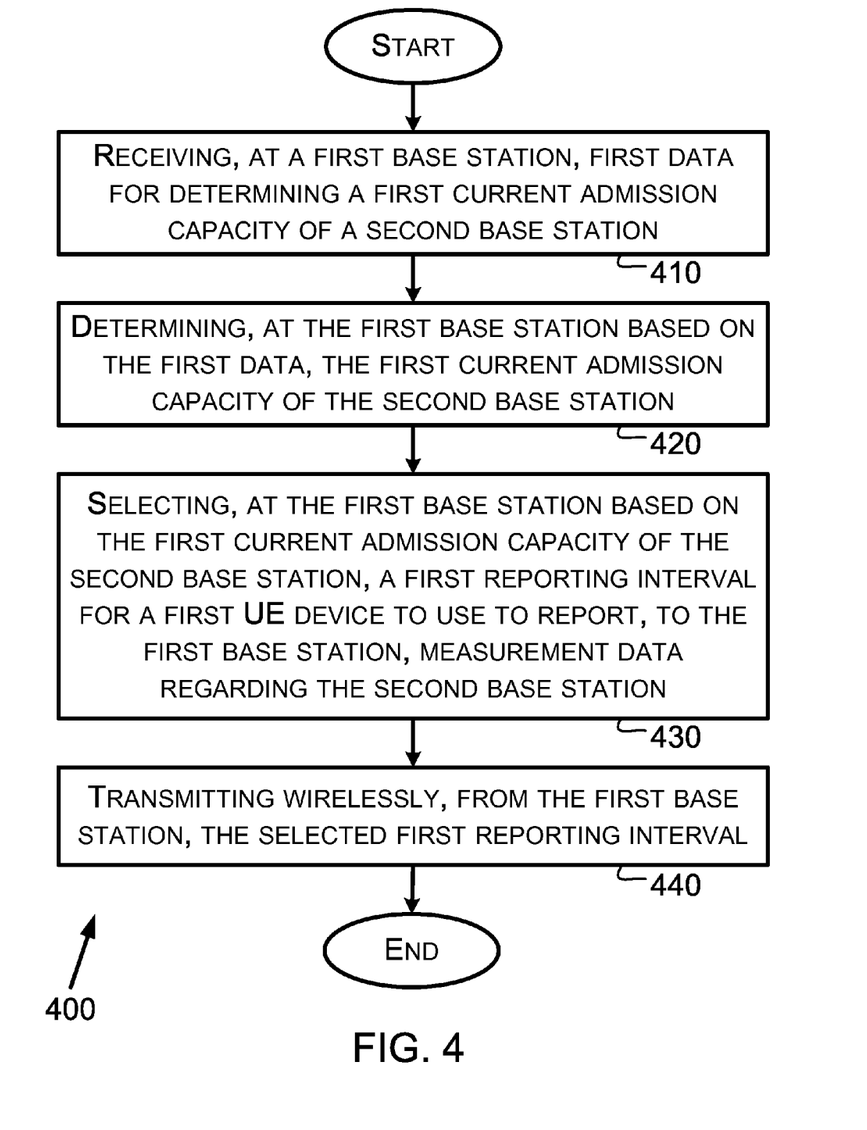
FIG. 4 is a flowchart depicting a set of functions that can be carried out in accordance with one or more of the example embodiments.

CRPI 210 can comprise a variety of program instructions, executable by processor 200, to cause the elements of base station 106 to perform one or more of the functions described herein as being performed by a base station, including, but not limited to, one or more of the functions shown in FIG. 4.

CRPI 210 can, for example, include program instructions that cause base station 106 to receive data for determining a current admission capacity of a neighbor base station (for example, base station 104). Base station 104 can transmit the data to base station 106 over communication link 140 or transport network 122. In one respect, the received data can identify the current admission capacity. In that way, execution of the program instructions can cause data storage device 206 to store the received data as the admission capacity of Table 1. In another respect, the received data can identify loading information processor 200 can use to determine the admission capacity for the base station that transmitted the data.

Interval selection data 212 can comprise data that processor 200 can refer to so as to determine a reporting interval to transmit to one or more UE devices. Accordingly, interval selection data 212 can comprise a plurality of reporting intervals and a plurality of lookup values, each reporting interval associated with a respective look-up value. Upon determining the lookup value, processor 200 can select the reporting interval associated with the determined lookup value.

As an example, a lookup value in interval selection data 212 can be an admission capacity in the form of a percentage. Table 2 illustrates an example of interval selection data 212 in which the admission capacity lookup values are percentages. The reporting intervals are specified as a number of seconds or portions of a second.

TABLE 2

| Admission Capacity | Reporting interval |
|---|---|
| 90-100% | 500 microseconds |
| 75-89.9% | 100 milliseconds |
| 50-74.9% | 500 milliseconds |
| 25-49.9% | 1 second |
| 0-24.9% | 5 seconds |

CRPI 210 can comprise program instruction executable by processor 200 to determine the admission capacity and to refer to interval selection data 212 to determine the reporting interval associated with the determined admission capacity. CRPI 210 can comprise program instructions executable by processor 200 to cause wireless network interface 204 to transmit the determined reporting interval to one or more UE devices that base station 106 is serving.

Measurement report data 218 can comprise measurement report data that each UE device being served by base station 106 measures and transmits to wireless network interface 204 via a reverse-link communication. The data measured by a UE device can depend on the air interface protocol(s) used by the UE device. In accordance with embodiments in which the UE device operates according to the LTE protocol, the data measured by the UE device can include reference signal received power (RSRP) measurement data and reference signal received quality (RSRQ) measurement data measured by the UE device. Other examples of data that a UE device operating according to the LTE protocol can measure and report to base station 106 are possible. Other examples of data a UE device operating according to another protocol can measure and report to base station 106 are also possible. For instance, for UE devices operating according to a code division multiple access (CDMA) protocol or evolution data optimized (or evolution data only) (EV-DO) protocol, the UE device can use received signal strength indication (RSSI) or a ratio of received energy per chip to interference level (Ec/Io) indicator as measurement report data 218.

Figure 3:
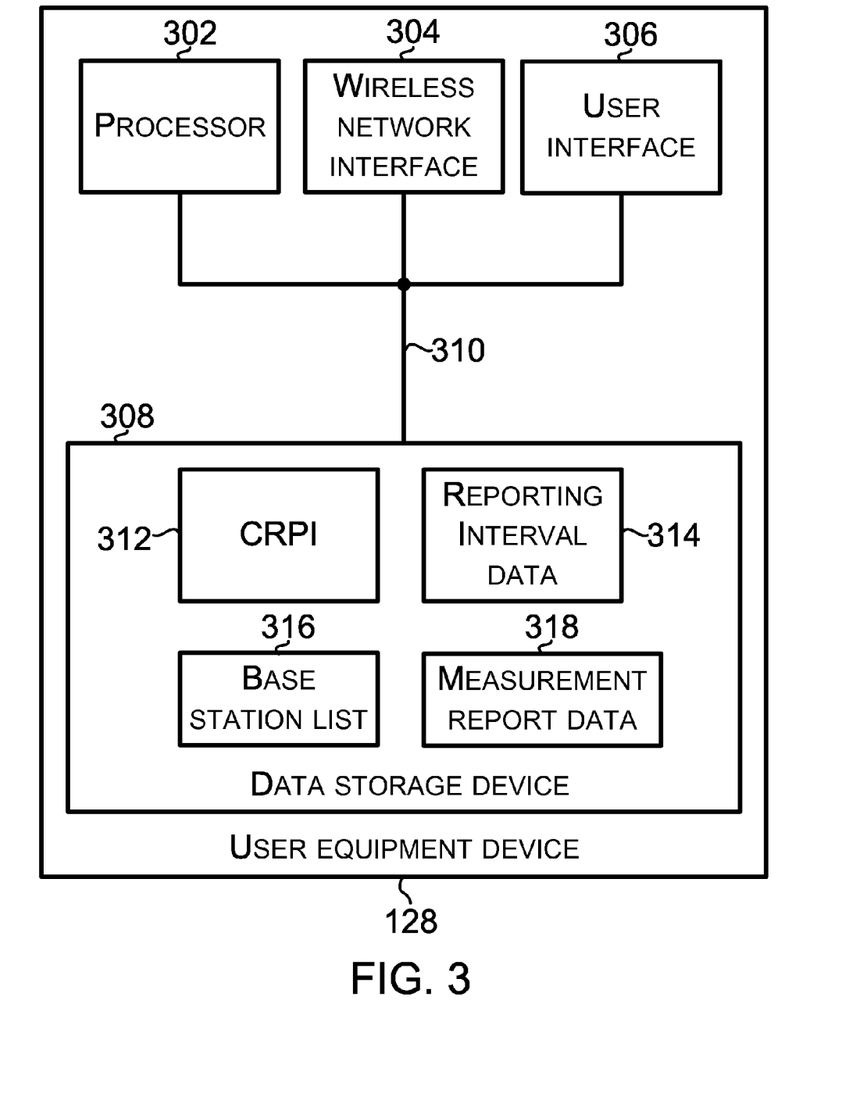
FIG. 3 is a block diagram of a user equipment (UE) device in accordance with one or more of the example embodiments.

Next, FIG. 3 is a block diagram of UE device 128 in accordance with one or more example embodiments described herein. UE device 128 can, for example, comprise or be configured as a cellular telephone, a personal digital, a tablet computing device, or a laptop computer. Other example configurations of UE device 128 are also possible. One or more other UE devices operable within system 100, such as one or more of UE devices 124, 126, 130, and 132, can be configured like UE device 128 as shown in FIG. 3.

UE device 128 comprises a processor 302, a wireless network interface 304, a user interface 306, and a data storage device 308, all of which can be linked together via a system bus, network, or other connection mechanism 310.

Processor 302 can comprise one or more general purpose processors (for example, INTEL single core microprocessors or INTEL multicore microprocessors) or one or more special purpose processors (for example, ASICs or DSPs). Processor 302 can execute computer-readable program instructions, such as computer-readable program instructions (CRPI) 312.

Wireless network interface 304 can engage in air interface communications with base stations such as those shown in FIG. 1. As such, wireless network interface 304 can include an antenna structure and a chipset arranged to support wireless communications according to one or more air interface protocols, such as those discussed above for instance. The chipset can also include, for example, a power amplifier and a cell site modem. The chipset can include a transmitter and a receiver, distinct from one another, or a transceiver including both a transmitter and a receiver. The chipset can be arranged as a MIMO system including multiple transmit antennas (for example, 2 or 4 antennas) and multiple receive antennas (for example, 2 or 4 antennas).

The air interface communications the wireless network interface 304 engages in can include data transmissions transmitted to a base station providing a coverage area in which UE device 128 is operating and data transmission received from that base station or a neighbor base station.

User interface (UI) 306 can include one or more components for a user of UE device 128 to input data or information to UE device 128. Those component(s) can be referred to as UI input component(s). As an example, the UI input components can include a touchscreen (for example, a capacitive touchscreen or a resistive touchscreen) to input selections made by the user. As another example, the UI input components can include a power switch to power on and power off UE device 128. As another example, the UI input components can include a microphone to receive voice communication, spoken by the user, for transmission within system 100.

User interface 306 can include one or more components to present data or information to the user of UE device 128. Those component(s) can be referred to as UI output component(s). As an example, the UI output components can include an audio speaker to output audible sounds such as voice communications and streaming music received via wireless network interface 304. As another example, the UI output components can include a display device, such as a thin film transistor display, a thin film diode display, an organic light-emitting diode display, a capacitive touch screen, or a resistive touchscreen.

Data storage device 308 can comprise a non-transitory computer-readable storage medium readable by processor 302. The computer-readable storage medium can comprise volatile and/or non-volatile storage components, such as optical, magnetic, organic or other memory or disc storage, which can be integrated in whole or in part with processor 302. Data storage device 308 may also or alternatively be provided separately, as a non-transitory machine readable medium.

Data storage device 308 can store CRPI 312, reporting interval data 314, a base station list 316, and measurement report data 318. Other examples of data that can be stored in data storage device 308 are also possible, some of which are described in other parts of this description.

Figure 5:
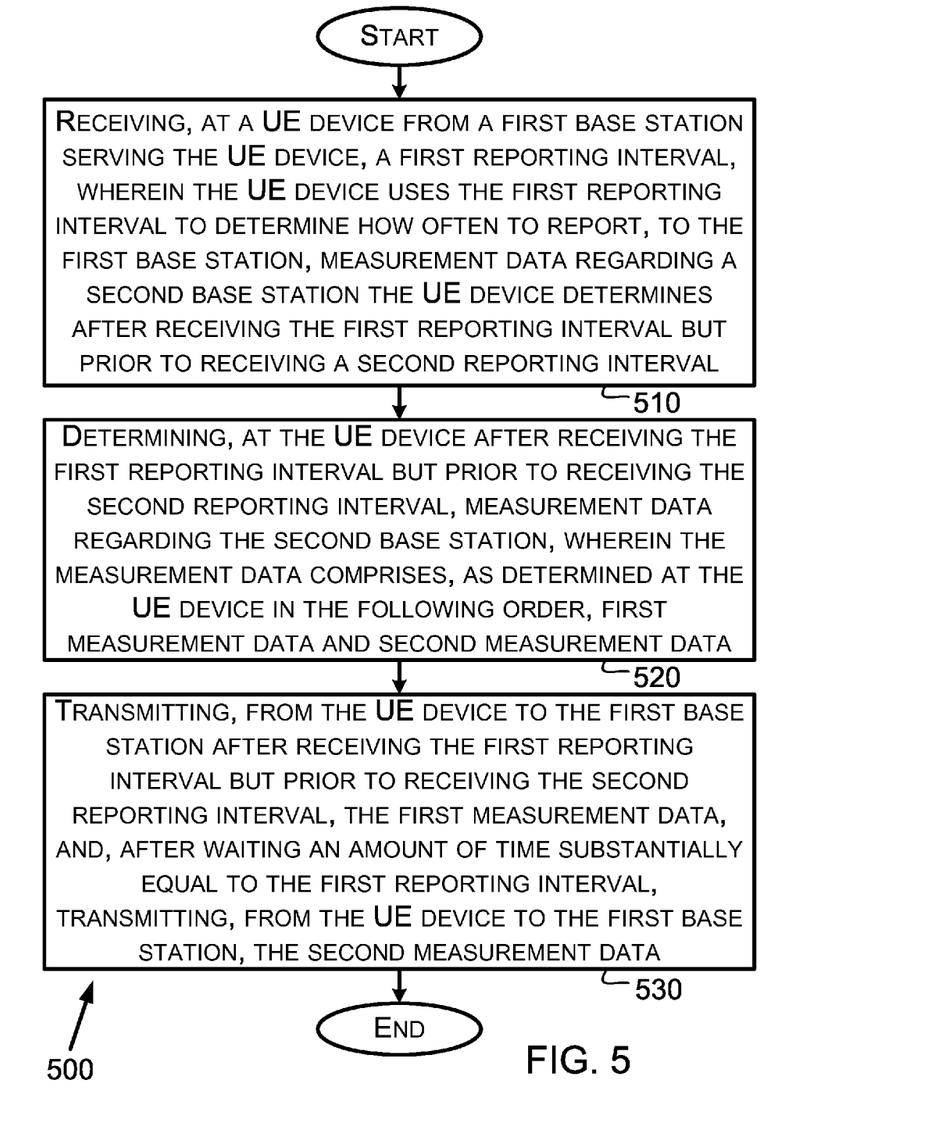
FIG. 5 is a flowchart depicting a set of functions that can be carried out in accordance with one or more of the example embodiments.

CRPI 312 can comprise a variety of program instructions, executable by processor 302, to cause one or more elements of UE device 128 to perform one or more of the functions described herein, including one or more of the functions shown in FIG. 5.

Base station list 316 can comprise data that identifies the base station serving UE device 128 as a serving base station and data that identifies one or more base stations that neighbor the serving base station. Base station list 316 can be modified after UE device hands off from the base station currently serving UE device 128 to another base station such that base station list 316 comprises data identifying the other base station as the serving base station and data identifying the base stations that neighbor the other base station. While base station list 316 is being modified, the data identifying the prior base station as the serving base station can be modified so that the prior serving base station is no longer the serving base station.

Measurement report data 318 can comprise measurement report data determined by UE device 128. In one respect, processor 302 can execute CRPI 312 to cause data, received from a base station using wireless network interface 304, to be stored as measurement report data 318. Execution of those program instructions can include parsing data messages received from the base station to uncover the data to be stored as measurement report data 318. In another respect, processor 302 can execute CRPI 312 to cause UE device to measure a signal transmitted by a base station. As an example, the signal can comprise a pilot signal transmitted by a base station. UE device 128 can measure a power level of the pilot signal received at UE device 128.

In yet another respect, processor 302 can execute CRPI 312 to determine which base station transmitted the data message or signal from which UE device 128 determines the measurement report data 318 to be stored in data storage device 308. Processor 302 can refer to base station list 316 to determine that base station that transmitted the data message or signal.

Reporting interval data 314 can include data that identifies a reporting interval UE device 128 is to use to report measurement data to the base station serving UE device 128. CRPI 312 can comprise program instructions processor 302 can execute to cause a reporting interval received from base station 106 to be stored as reporting interval data 314. Those program instructions can be executed each time wireless network interface 304 receives a reporting interval from the base station serving UE device 128.

III. Example Operation

Next, FIG. 4 is a flow diagram depicting a set of functions 400 that can be carried out in accordance with one or more example embodiments. The functions identified in FIG. 4 refer to a first UE device, a first base station, and a second base station. For purposes of describing FIG. 4, the first UE device is referred to as UE device 128, the first base station is referred to as base station 106, and the second base station is referred to as base station 108. The flow diagram in FIG. 4 includes blocks 410, 420, 430, and 440, each of which is described below.

Block 410 includes receiving, at a first base station 106, first data for determining a first current admission capacity of a second base station 108. Second base station 108 can transmit the first data to network interface 202 using communication link 140 or a transport network 122. In one respect, the first data can identify the first current admission capacity. In another respect, the first data can comprise data that processor 200 can use to determine the first current admission capacity.

Second base station 108 can monitor its admission capacity. In one respect, second base station 108 can transmit data for determining the current admission capacity of the second base station upon or in response to second base station 108 determining its admission capacity has changed. In another respect, second base station 108 can periodically transmit data for determining its admission capacity. Second base station 108 can transmit data for determining its admission capacity to each of its neighbor base stations. The first data received at first base station 106 can be among the data transmitted by second base station 108.

In addition to receiving the first data, base station 106 can transmit, to base stations neighboring base station 106, data that the neighboring base stations can use to determine the admission capacity of base station 106. Communication links 140, 142, and transport networks 122 can carry that data to the neighboring base stations.

Block 420 includes determining, at the first base station 106 based on the first data, the first current admission capacity of the second base station. If the first data indicates a current admission capacity, then determining the first current admission capacity can comprise the processor 200 determining the current admission capacity from the first data. If the first data indicates data other than the first currently admission capacity (for example, load information of base station 108), then determining the first current admission capacity can comprise processor 200 executing CRPI 210 to plug the first data into a formula to determine the first current admission capacity. Upon determining the first current admission capacity, processor 200 can refer to interval selection data 212 to determine the reporting interval for that current admission capacity.

Block 430 includes selecting, at the first base station 106 based on the first current admission capacity of the second base station 108, a first reporting interval for a first UE device 128 to use to report, to the first base station 106, measurement data regarding the second base station 108. Processor 200 can execute CRPI 210 to cause processor 200 to select the first reporting interval from interval selection data 212. In accordance with an embodiment in which the interval selection data 212 is arranged like Table 2 and the first current admission capacity is 77%, the first reporting interval is 100 milliseconds.

Block 440 includes transmitting wirelessly, from the first base station 106, the selected first reporting interval. Processor 200 can execute CRPI 210 to cause wireless network interface 204 to transmit the first reporting interval. Execution of those program instructions can cause processor 200 can generate a message comprising the first reporting interval. That message, generated by processor 200, can be a broadcast message directed to multiple UE devices, such as all UE devices that the first base station 106 is serving. Alternatively, that message can be a message addressed to UE device 128.

Moreover, processor 200 can repeatedly select a reporting interval from interval selection data 212. Each time a subsequently selected reporting interval is selected, processor 200 can execute CRPI 210 to cause wireless network interface 204 to transmit the selected reporting interval to one or more UE devices being served by base station 106.

Base station 106 can perform additional functions with regard to admission capacities or measurement data. For example, the base station 106 can (i) receive second data for determining a current admission capacity of a third base station 104, (ii) determine, based on the second data, the current admission capacity of base station 104, (iii) select, based on the current admission capacity of base station 104, a second reporting interval for at least one UE device to use to report, to base station 106, measurement data regarding base station 104, and (iv) wirelessly transmit the selected second reporting interval. Base station 106 serves the at least one UE device. Base station 106 can transmit the second reporting interval to the at least one UE device.

As another example, base station 106 can (i) receive second data for determining a second current admission capacity of base station 108, (ii) determine, based on the second data, the second current admission capacity of base station 108, (iii) select, based on the second current admission capacity of base station 108, a second reporting interval for UE device 128 to use, instead of the first reporting interval, to report measurement data regarding base station 108 to base station 106, and (iv) wirelessly transmit the selected second reporting interval.

As yet another example, base station 106 can (i) receive second data for determining a second current admission capacity of base station 108, (ii) determine, based on the second data, the second current admission capacity of base station 108, (iii) determine that the first current admission capacity equals the second current admission capacity, and (iv) determine that base station 106 does not have to determine or transmit a reporting interval based on the second current admission capacity. Base station 106 did not determine any intervening current admission capacity of base station 108 after determining the first current admission capacity and prior to determining the second current admission capacity.

Next, FIG. 5 is a flow diagram depicting a set of functions 500 that can be carried out in accordance with one or more example embodiments. The functions identified in FIG. 5 refer to a UE device, a first base station, and a second base station. For purposes of describing FIG. 5, the UE device is referred to as UE device 128, the first base station is referred to as base station 106, and the second base station is referred to as base station 108. The flow diagram in FIG. 5 includes blocks 510, 520, and 530, each of which is described below.

Block 510 includes receiving, at a UE device 128 from a first base station 106 serving the UE device 128, a first reporting interval, wherein the UE device 128 uses the first reporting interval to determine how often to report, to the first base station 106, measurement data regarding a second base station 108 the UE device 128 determines after receiving the first reporting interval but prior to receiving a second reporting interval. Processor 302 can execute CRPI 312 to cause UE device 128 to receive the first reporting interval at wireless network interface 304, and to cause the first reporting interval to be stored as reporting interval data 314. First base station 106 can transmit the first reporting interval to UE device 128 using forward link signals of air interface 134.

Block 520 includes determining, at the UE device 128 after receiving the first reporting interval but prior to receiving the second reporting interval, measurement data regarding the second base station 108, wherein the measurement data comprises, as determined at the UE device 128 in the following order, first measurement data and second measurement data. Processor 302 can execute CRPI 312 to determine the first and second measurement data.

Moreover, processor 302 can execute CRPI 312 to determine whether threshold conditions exist that trigger UE device 128 to begin measuring data for reporting to base station 106. As an example, those program instructions can be executable to determine that a power of reverse-link signals received at UE device 128 from base station 106 are below a threshold power level. Other examples of those program instructions are also possible.

Block 530 includes transmitting, from the UE device 128 to the first base station 106 after receiving the first reporting interval but prior to receiving the second reporting interval, the first measurement data, and, after waiting an amount of time substantially equal to the first reporting interval, transmitting, from the UE device 128 to the first base station 106, the second measurement data. Processor 302 can execute CRPI 312 to start a timer at the time the first measurement data is transmitted to base station 106 and to determine when that timer has counted an amount of time that equals or exceeds the first reporting interval. Upon determining the time has counted that amount of time, processor 302 can cause wireless network interface 304 to transmit the second measurement data.

As an example, the amount of time substantially equal to the first reporting interval can be equal to the first reporting interval. As another example, the amount of time substantially equal to the first reporting interval can be an amount of time within the range of the first reporting interval plus and minus 100 milliseconds. As another example, the amount of time substantially equal to the first reporting interval can be an amount of time within the range of the first reporting interval plus and minus 500 milliseconds or 1 second. Other examples of that amount of time are also possible.

After transmitting the second measurement data, UE device 128 can continue to determine measurement data and transmit that measurement data to base station 106 at intervals equal to the reporting interval until the reporting interval changes or UE device 128 determining that handover from base station 106 is no longer necessary.

UE device 128 can perform additional functions with regard to measurement data. For example, after UE device 128 receives the first reporting interval, UE device 128 can receive the second reporting interval from base station 106. UE device 128 can use the second reporting interval to determine how often to report, to base station 106, measurement data regarding base station 108 the UE device 128 determines after receiving the second reporting interval.

As another example, after receiving the second reporting interval, UE device 128 can determine additional measurement data regarding base station 108. The additional measurement data can comprises third measurement data and fourth measurement data (determined in that order).

As yet another example, after receiving the second reporting interval, UE device 128 can transmit the third measurement data to base station 106. After waiting an amount of time substantially equal to the second reporting interval, UE device 128 can transmit the fourth measurement data to base station 106.

In accordance with the example embodiments, base station 106 can periodically transmit a reporting interval to UE device 128. In that regard, after transmitting a given reporting interval, one or more reporting intervals transmitted in the periods immediately following transmission of the given reporting interval can be equal to the given reporting interval. In accordance with one or more other example embodiments, base station 106 may only transmit subsequent reporting intervals to UE device 128 if the subsequent reporting interval differs from the most recent reporting interval transmitted to UE device 128.

In accordance with the example embodiments, the reporting intervals transmitted by base station 106 can vary linearly or exponentially as the loading of the base station varies. For example, with a default reporting interval of n micro seconds for a given base station loading value, as the base station loading increases to a maximum base station loading, the reporting intervals can increase to 2 times n micro seconds, 3 times n micro seconds, and 4 times n micro seconds for increasing base statin loading values. Then as the base station loading decreases back to the given base station loading, the reporting intervals can decrease from a value of 4 times n micro seconds, to 3 times n micro seconds, then to 2 times n micro seconds and then to n micro seconds. Although 4 different reporting intervals are described in that example, another quantity of reporting intervals could be used for a default reporting interval to a reporting level for maximum base station loading, and any intervening reporting intervals.

IV. Conclusion

Example embodiments have been described above. Those skilled in the art will understand that changes and modifications can be made to the described embodiments without departing from the true scope and spirit of the present invention, which is defined by the claims.

We claim:

1. A method comprising:
receiving, at a first base station, first data for determining a first load of a second base station, wherein the first base station and the second base station are neighbor base stations to each other, and wherein the first base station is serving a first user equipment (UE) device;
determining, at the first base station based on the first data, the first load of the second base station;
determining, at the first base station, that the first load of the second base station is different than a prior load of the second base station, wherein the first base station determined the prior load based on second data received at the first base station for determining the prior load of the second base station;
selecting, at the first base station based on the first load of the second base station and in response to determining that the first load of the second base station is different than the prior load of the second base station, a first reporting interval for the first UE device to use to report, to the first base station, measurement data regarding the second base station, wherein the first reporting interval is different than a prior reporting interval selected at the first base station based on the prior load of the second base station; and
transmitting wirelessly, from the first base station, the selected first reporting interval.

2. The method of claim 1, further comprising:
receiving, at the first base station, third data for determining a first load of a third base station, wherein the first base station and the third base station are neighbor base stations to each other;
determining, at the first base station based on the third data, the first load of the third base station;
selecting, at the first base station based on the first load of the third base station, a second reporting interval for at least one UE device to use to report, to the first base station, measurement data regarding the third base station, wherein the first base station is serving the at least one UE device; and
transmitting wirelessly, from the first base station, the selected second reporting interval.

3. The method of claim 2, further comprising:
storing, at the first base station, interval selection data from which the first base station selects the first reporting interval and the second reporting interval.

4. The method of claim 3,
wherein the interval selection data comprises first interval selection data from which the first base station selects the first reporting interval and second interval selection data from which the first base station selects the second reporting interval,
wherein the first interval selection data is associated with base stations configured to communicate using a first air interface protocol and the second interval selection data is associated with base stations configured to communicate using a second air interface protocol, and
wherein the first base station is configured to communicate using the first air interface protocol and the second base station is configured to communicate using the second air interface protocol.

5. The method of claim 2,
wherein the first load of the second base station indicates a capacity for the second base station to serve additional UE devices, and
wherein the first load of the third base station indicates a capacity for the third base station to serve additional UE devices.

6. The method of claim 1, further comprising:
receiving, at the first base station, third data for determining a second load of the second base station;
determining, at the first base station based on the third data, the second load of the second base station;
selecting, at the first base station based on the second load of the second base station, a second reporting interval for the first UE device to use, instead of the first reporting interval, to report, to the first base station, measurement data regarding the second base station;
transmitting wirelessly, from the first base station, the selected second reporting interval.

7. The method of claim 2, wherein the at least one UE device comprises the first UE device.

8. The method of claim 1, further comprising:
transmitting, from the first base station to the second base station, data the second base station can use to determine a load of the first base station.

9. The method of claim 1, wherein receiving the first data comprises the first base station receiving the first data from the second base station.

10. The method of claim 1, further comprising:
receiving, at the first base station, third data for determining a second load of the second base station;
determining, at the first base station based on the third data, the second load of the second base station, wherein the first base station did not determine any intervening load of the second base station after determining the first load and prior to determining the second load;
determining, at the first base station, that the first load equals the second load; and
determining, at the first base station, that first base station does not have to determine or transmit a reporting interval based on the second load.

11. The method of claim 1, wherein load of the second base station changes as a number of UE devices the second base station is serving changes.

12. A base station system comprising:
- a network interface configured to receive first data for determining a first load of a second base station, wherein the base station system and the second base station are neighbor base stations to each other, and wherein the base station system is configured to serve a first user equipment (UE) device;
- a processor;
- a data storage device storing computer-readable program instructions, wherein the program instructions are executable by the processor to perform a set of functions, wherein the set of functions includes:
  - determining, based on the first data, the first load of the second base station,
  - determining that the first load of the second base station is different than a prior load of the second base station, wherein the base station system determined the prior load based on second data received at the base station system for determining the prior load of the second base station, and
  - selecting, based on the first load of the second base station and in response to determining that the first load of the second base station is different than the prior load of the second base station, a first reporting interval for the first UE device to use to report, to the base station system, measurement data regarding the second base station, wherein the first reporting interval is different than a prior reporting interval selected at the first base station based on the prior load of the second base station; and
- a wireless network interface configured to transmit, wirelessly, the selected first reporting interval.

13. The base station system of claim 12, wherein transmission of the first reporting interval using the wireless network interface is a broadcast transmission directed to the first UE device and at least one other UE device.

14. The base station system of claim 12,
- wherein the data storage device further stores interval selection data, and
- wherein the interval selection data comprises multiple reporting intervals from which the first base station selects the first reporting interval.

15. A method comprising:
- receiving, at a user-equipment (UE) device from a first base station serving the UE device, a first reporting interval regarding a second base station and a first reporting interval regarding a third base station that is different than the first reporting interval regarding the second base station, wherein the first reporting interval regarding the second base station indicates how often the UE device is to report measurement data regarding the second base station to the first base station, and wherein the first reporting interval regarding the third base station indicates how often the UE device is to report measurement data regarding the third base station to the first base station;
- determining, at the UE device after receiving the first reporting interval regarding the second base station but prior to receiving a second reporting interval regarding the second base station, measurement data regarding the second base station, wherein the measurement data regarding the second base station comprises, as determined at the UE device in the following order, first measurement data regarding the second base station and second measurement data regarding the second base station; and
- transmitting, from the UE device to the first base station after receiving the first reporting interval regarding the second base station but prior to receiving the second reporting interval regarding the second base station, the first measurement data regarding the second base station, and, after waiting an amount of time substantially equal to the first reporting interval regarding the second base station, transmitting, from the UE device to the first base station, the second measurement data regarding the second base station.

16. The method of claim 15, further comprising:
- receiving, at the UE device from the first base station after the UE device receives the first reporting interval regarding the second base station, the second reporting interval regarding the second base station, wherein the UE device uses the second reporting interval regarding the second base station to determine how often to report, to the first base station, measurement data regarding the second base station the UE device determines after receiving the second reporting interval regarding the second base station;
- determining, at the UE device after receiving the second reporting interval regarding the second base station, additional measurement data regarding the second base station, wherein the additional measurement data comprises, as determined at the UE device in the following order, third measurement data regarding the second base station and fourth measurement data regarding the second base station; and
- transmitting, from the UE device to the first base station after receiving the second reporting interval regarding the second base station, the third measurement data regarding the second base station, and, after waiting an amount of time substantially equal to the second reporting interval regarding the second base station, transmitting, from the UE device to the first base station, the fourth measurement data regarding the second base station.

17. The method of claim 16,
- wherein the second reporting interval regarding the second base station differs from the first reporting interval regarding the second base station.

18. The method of claim 15, further comprising:
- receiving, at the UE device from the second base station, signals from which the UE device determines the first measurement data regarding the second base station and the second measurement data regarding the second base station.

19. The method of claim 15, wherein the amount of time substantially equal to the first reporting interval regarding the second base station is equal to the first reporting interval regarding the second base station.

20. The method of claim 15, wherein the amount of time substantially equal to the first reporting interval regarding the second base station is an amount of time within a range of the first reporting interval regarding the second base station plus 100 milliseconds and the first reporting interval regarding the second base station minus 100 milliseconds.

21. The method of claim 1,
- wherein receiving the first data occurs while the first base station is serving multiple UE devices,
- wherein one of the multiple UE devices includes the first UE device, and wherein transmitting the selected first reporting interval from the first base station wirelessly includes the first base station wirelessly broadcasting the first reporting interval to the multiple UE devices served by the first base station.

22. The method of claim 1,
wherein the prior load is greater than the first load, and
wherein the prior reporting interval is shorter than the first reporting interval.

23. The method of claim 1,
wherein the prior load is less than the first load, and
wherein the prior reporting interval is longer than the first reporting interval.

24. The method of claim 15,
wherein the first reporting interval regarding the second base station is based on a first load of the second base station,
wherein the second reporting interval regarding the second base station is based on a second load of the second base station, and
wherein the second load of the second base station is greater than or less than the first load of the second base station.

* * * * *